United States Patent [19]
Honeycutt

[11] 3,799,032
[45] Mar. 26, 1974

[54] SAFETY HOLDING VALVE ROD EYE ASSEMBLY

[75] Inventor: Don R. Honeycutt, Bryan, Tex.

[73] Assignee: Omark Industries, Inc., Portland, Oreg.

[22] Filed: Jan. 17, 1972

[21] Appl. No.: 218,539

Related U.S. Application Data

[63] Continuation of Ser. No. 821,192, May 2, 1969, abandoned.

[52] U.S. Cl.................. 91/420, 91/453, 137/493.3, 137/493.6
[51] Int. Cl. .......................................... F15b 13/042
[58] Field of Search ............. 91/216, 222, 224, 420, 91/422, 432, 446, 451, 452, 468, 453, 367; 137/493.6, 493.3, 493.1, 493.9

[56] References Cited
UNITED STATES PATENTS

| 2,501,139 | 3/1950 | Patrick................... 137/493.6 X |
| 2,747,550 | 5/1956 | Cosgrove................ 91/452 |
| 2,918,902 | 12/1959 | Robinson et al........... 91/452 X |
| 2,957,456 | 10/1960 | Schultze et al. .......... 91/432 |
| 3,153,423 | 10/1964 | Biello et al............... 137/493.6 X |
| 3,273,466 | 9/1966 | Balogh et al............. 91/420 |
| 3,309,024 | 3/1967 | Maddalozzo............. 137/493.6 X |
| 3,359,868 | 12/1967 | Hoffman et al........... 91/447 |
| 3,399,786 | 9/1968 | Honeycutt............... 212/58 |
| 3,405,606 | 10/1968 | Scheffer................. 91/468 X |
| 3,477,458 | 11/1969 | Maddalozzo............. 137/493.3 |

Primary Examiner—Irwin C. Cohen
Attorney, Agent, or Firm—Henry W. Hope

[57] ABSTRACT

The present invention is directed to rod eye assemblies for use on hydraulic piston and cylinder units, wherein actuating fluid is supplied to both sides of the piston through the piston rod, and more particularly to rod eye assemblies having a safety holding valve in one of the passages leading to the hydraulic unit. Two conduits are employed in the valve, the first being opened when fluid is directed into the hydraulic unit through the safety holding valve assembly. The second conduit is opened when subjected to a large fluid pressure being exerted from the hydraulic unit. This is accomplished by having a spool slidable within a fluid passageway and having on its exterior an annular flange, this flange being biased into engagement with a mating annular flange in the passageway. The other conduit and means is provided by having a ball and seat within a passageway extending through the spool.

3 Claims, 5 Drawing Figures

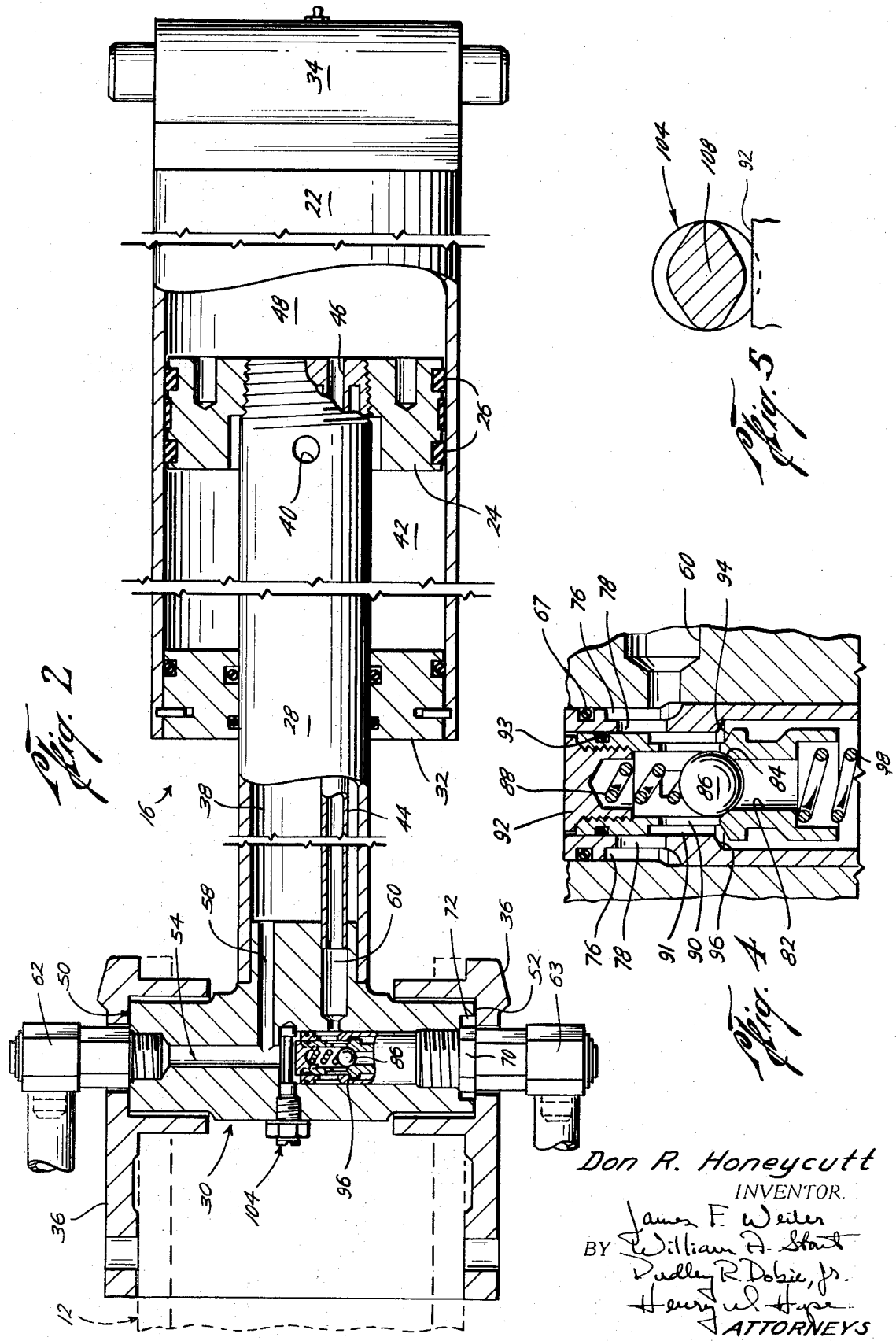

SAFETY HOLDING VALVE ROD EYE ASSEMBLY

CROSS-REFERENCES TO RELATED APPLICATIONS

This is a continuation of application Ser. No. 821,192, filed May 2, 1969, and now abandoned, by Don R. Honeycutt for his invention entitled Safety Holding Valve Rod Eye Assembly.

BACKGROUND OF THE INVENTION

It is well known in the manufacture of hydraulic cranes to utilize hydraulic cylinder and piston units (hereinafter sometimes referred to as "hydraulic units" "units") in which the actuating fluid is supplied to both sides of the piston through conduit means in the piston rod. To be able to do this, it is necessary to have what is known as a rod eye assembly at the outermost or free end of the piston rod. This assembly allows this end of the piston rod to rotate as it extends and retracts, and at the same time, provides means whereby fluid can be moved to or from the hydraulic unit, regardless of the previously mentioned rotation. Such environment for rod eye assemblies are more fully disclosed in my U. S. Pat. No. 3,399,786, issued Sept. 3, 1968, entitled Hydraulic Crane Rod Eye Assembly.

As will be readily understood, it is desirable to provide safety means, whereby the fluid in the cylinder cannot escape suddenly or unexpectedly. This could easily cause damage to the crane, as well as nearby equipment and possible injury to personnel. Previous such devices employ safety valves which are mounted externally of the hydraulic unit and/or rod eye assembly. This, of course, suffers from the disadvantage that such externally mounted units can be disconnected or knocked off or otherwise more easily damaged. Thus, the safety feature provided by this unit will be lost.

Another disadvantage of previously known units is that when a heavy load supported by the hydraulic unit is being lowered, the weight of the load can force a too rapid evacuation of hydraulic fluid from the cylinder. This allows a somewhat uncontrolled and too rapid lowering of the load and can, once again, result in damage and injury. This is especailly true when the crane is being used to lift a platform or bucket carrying workmen.

SUMMARY OF THE PRESENT INVENTION

In the preferred embodiment, this safety valve assembly is mounted in the rod eye passageway which connects with the side of the piston to which fluid is added in order to extend the piston rod. Thus, the rod cannot retract or collapse suddenly or unexpectedly.

The safety holding valve assembly is positioned between the inlet for the passageway and the outlet which connects with the conduit means contained within the piston rod. A spool having a smaller diameter than the passageway is utilized, thus providing an annulus through which fluid may flow. A second path of travel for the actuating fluid is provided by a passage extending through the center of the spool. Sealing means for the annulus is provided by two mating flanges, one on the exterior of the spool and one on the sidewall of the passageway. Spring means biases the spool away from the inlet, thus engaging the mating flanges. Excess pressure exerted on the spool from the outlet will overcome the force provided by the spring means to unseat the flanges, thus allowing fluid to flow from the cylinder when desired. By proper selection of the strength of the spring means, as acceptable safety factor is provided.

A ball valve is used to seal the passage extending through the spool, the ball closure member being biased into its seat by spring means and the bias being directed away from the outlet. In this manner, fluid entering the passageway from the external port or inlet will unseat the ball and go on into the piston rod. At the same time, fluid trying to escape through the piston rod will merely tighten the seal formed between the ball and its seat. For this reason, the spring means used for the ball valve may be of substantially less strength than the first mentioned spring means.

Manually operated cam means are also provided to unseat the previously mentioned mating flanges so that hydraulic fluid may be released from the hydraulic unit should the power used to normally move the fluid be lost for some reason.

It is, therefore, an object of the present invention to provide an improved rod eye assembly having as an integral part thereof a safety holding valve.

It is a further object of the present invention to provide such a rod eye assembly with the safety holding valve being of simple construction, whereby it may be manufactured, assembled and used in an easy and inexpensive manner.

It is a still further object of the present invention to provide such a safety valve which will prevent undesired and sudden release of actuating fluid from the hydraulic cylinder, especially in circumstances when the pressure is suddenly lost leading into the rod eye assembly.

Another object of the present invention is to provide such a safety holding valve which will prevent a too rapid lowering of a crane boom or other similar piece of equipment due to the fact that the boom is carrying such a heavy load that the load itself forces the hydraulic fluid out of the hydraulic cylinder at a rate faster than desired.

Other and further objects, features and advantages will be apparent from an examination of the following description of a presently preferred embodiment of this invention, which is given for the purpose of disclosure, when taken in conjunction with the accompanying drawings.

BRIEF DESCRIPTION OF THE DRAWINGS

Like character references designate like parts throughout the several views of the drawings, which views are as follows:

FIG. 2 is a plan view, in section, of a hydraulically operated piston and cylinder unit showing the present invention incorporated therein.

FIG. 4 is a partial plan view, in section, of the safety holding valve with the spool in its open position, and FIG. 5 is an end view, in section, of the cam member used to manually move the spool to its open position.

BRIEF DESCRIPTION OF THE PREFERRED EMBODIMENT

Figure 1:
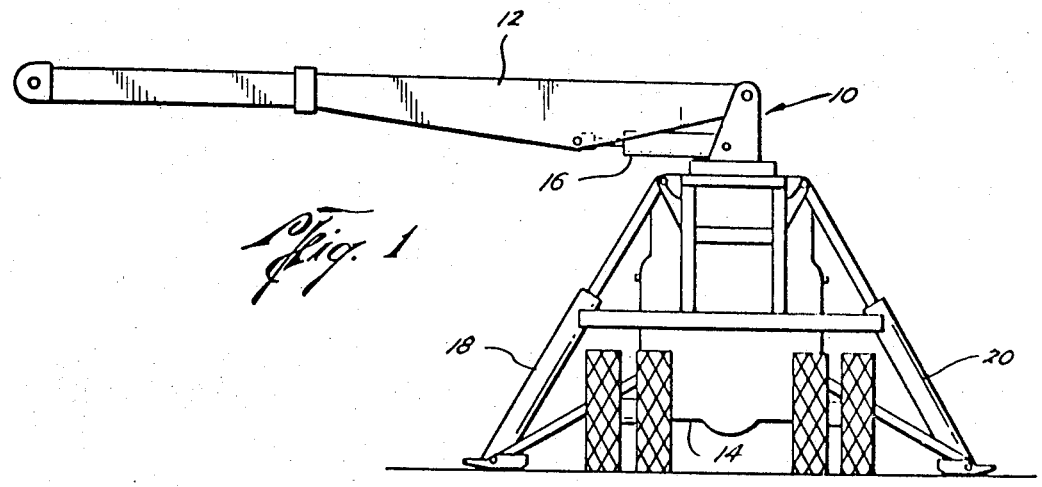
FIG. 1 is an end view of a truck mounted hydraulic crane in which the present invention may be incorporated.

Referring now to the drawings, and in particular, FIG. 1, a hydraulic crane on which the present invention may be utilized is generally indicated by the reference numeral 10. This crane has a boom 12 suitably mounted on a support such as a truck 14. The crane 10 is hydraulically actuated by the use of a plurality of double acting piston cylinder units such as the unit 16 for raising and lowering the boom 12, and the units 18 and 20 which act as outrigger supports to provide lateral and vertical support to the crane. As is conventionally known, the hydraulic units 16, 18 and 20 are pivotally connected at each end to allow rotative movement at the pivot connections when the units are actuated so as to be extended and retracted. Such conventional units, however, generally utilize external flexible hoses connected to opposite ends of the cylinder, which hoses are readily subjected to wear, damage, and accidental disconnection.

Referring now to FIG. 2, there is shown a typical double acting hydraulic unit which incorporates the present invention. This hydraulic unit is a unit 16, although it may be any of the hydraulic units shown in FIG. 1, as well as units used in other applications. This unit is comprised generally of a cylinder 22, having mounted therein a piston 24. Appropriate piston packing and a piston ring are included as at 26. This piston is attached to the piston rod 28, mounted on the opposite end of which is the rod eye assembly 30, which is the subject matter of the present invention and will be discussed more fully below. The cylinder 22 has an appropriate packing gland 32 at each of its ends, only one of which is shown in FIG. 2. A connecting pin 34 is attached to one end of the cylinder for connection of this end of the hydraulic unit to the crane for pivotal movement. The rod eye assembly is attached by means of a rod end mounting clip 36 to the frame of the crane boom. This is more clearly disclosed in my previously mentioned U.S. Pat. No. 3,399,786.

The piston rod 28 is a hollow rod having a first passageway 38 formed due to the fact that it is hollow. This passageway has an outlet port 40 in the piston rod, and thus supplies actuating fluid to the side 43 of the piston which retracts the rod. For purposes of discussion, this side 42 will be referred to as the "low side" of the piston. A tubular conduit 44 is also contained within the piston rod and has an outlet 46 in the piston itself. This conduit 44, accordingly, supplies fluid to the side 48 of the piston. Since this is the side which extends the piston rod when fluid is added, this shall be referred to for purposes of convenience as the "high side" of the piston.

Referring now to the rod eye assembly 30 and to FIGS. 2 and 4, the assembly has two opposed ends or sides 50 and 52, and passageways 54 and 56 extend into the rod eye assembly from these opposed ends. The passageway 54 is connected by means of the outlet or port 58 to the conduit 38 formed by the hollow piston rod, and the passage 56 is connected by the outlet or port 60 to the conduit 44. Accordingly, it is the passageway 56 which supplies hydraulic fluid to the high side 48 of the piston. The passageways 54 and 56 have swivel joint connecting means 62 and 63, respectively, threadedly engaging the openings of the passageways. These swivel connecting means allow hydraulic fluid to be supplied to the passageways regardless of the rotation at the rod eye assembly as the piston rod extends and retracts. This also is more fully explained in my previously mentioned copending application.

Discussing now the safety valve assembly which is contained in the passageway 56 and is generally indicated by the numeral 64, it is, in this embodiment, a self contained cartridge which is inserted into and removed from the passageway as a unit. This cartridge is comprised of an outer casing or housing 66 which extends substantially the entire length of the passageway 56, and is threadedly secured thereto as at 68. A seal 67 is positioned at the innermost end of the housing. An enlarged head 70 is on the exterior of this housing and is shaped to receive an appropriate tool for tightening the cartridge into the passageway. A recess 72 in the end 52 receives this head 70, as well as provides space 72 for the wrench or tool used to tighten the cartridge in the passageway. The swivel joint 63 for the passageway 56 is actually threadedly engaged with the interior of the housing 66, as at 74, rather than the passageway itself. An annulus 76 is formed between the housing and the sidewall of the passageway, which annulus communicates with the outlet port 60. A plurality of openings 78 are contained within the housing 66 and communicate with the annulus 76.

A spool 80 is slidably mounted within the housing and has a passageway 82 extending through the spool. This passageway carries a seat 84 and a ball closure member 86. This ball 86 is normally biased into engagement with the seat 84 by means of the spring 88. A plurality of ports 90 are located in the sidewall of the spool. Since the spool is of a smaller diameter than the adjacent portions of the interior of the casing 66, an annulus 91 is formed which extends the length of the spool. Accordingly, the interior passage 82 of the spool can communicate through the openings 90, the annulus 91, the openings 78 and the annulus 76 with the outlet port 60. An end cap 92 is fixedly secured on the innermost end of the spool. The spring 88 coacts with this end cap 92 to bias the ball 86 into its closed position. The spool is slidable relative to the casing 66, and accordingly, a sliding seal member 93 is carried by the spool and forms a seal between the spool and the sidewall of the casing.

An external annular flange 94 is carried by the spool 80 and is urged into mating engagement with another annular flange 96 on the casing 66 by a spring 98. This spring 98 coacts with another annular flange 100 which is threadably mounted on the casing 66. This flange 100 carries stop members 102 which coact with the spool 80 to prevent it from shifting too far toward the passageway opening.

A cam member generally indicated by the numeral 104 is threadedly engaged in the rod eye body and has an external portion 106. This external portion carries a slot which will receive a screwdriver to rotate the cam member 104. This cam member has a cam portion 108, a section of which is shown in FIG. 5. With the exception of the portion 108, the member 104 is circular in cross section so that it may rotate in order to engage the cam portion 108 with the end 92 of the spool.

Turning now to the operation of the present invention, the operation of the double acting hydraulic unit having conduit means within the piston rod is conventional, and accordingly, need not be fully explained here. Only general statements as to its operation will be given in order to aid in the explanation of the present invention.

In order to extend the piston rod 28, fluid is pumped through the swivel joint 63 and into the passageway 56. The pressure exerted by this fluid will overcome the bias created by the spring 88 which urges the closure member 86 againt the seat 84. Accordingly, the ball will shift to the position shown in FIG. 3 and the actuating fluid will flow through the passageway 82, the openings 90, the portion of the annulus 91 above the seal formed by the flanges 94 and 96, the openings 78, the annulus 76 and into the ports 60. From here, it will flow to the conduit 44 and into the side 48 of the cylinder. This will cause the piston to move and force fluid in the side 42 of the cylinder out through the passageway 54.

Figure 3:
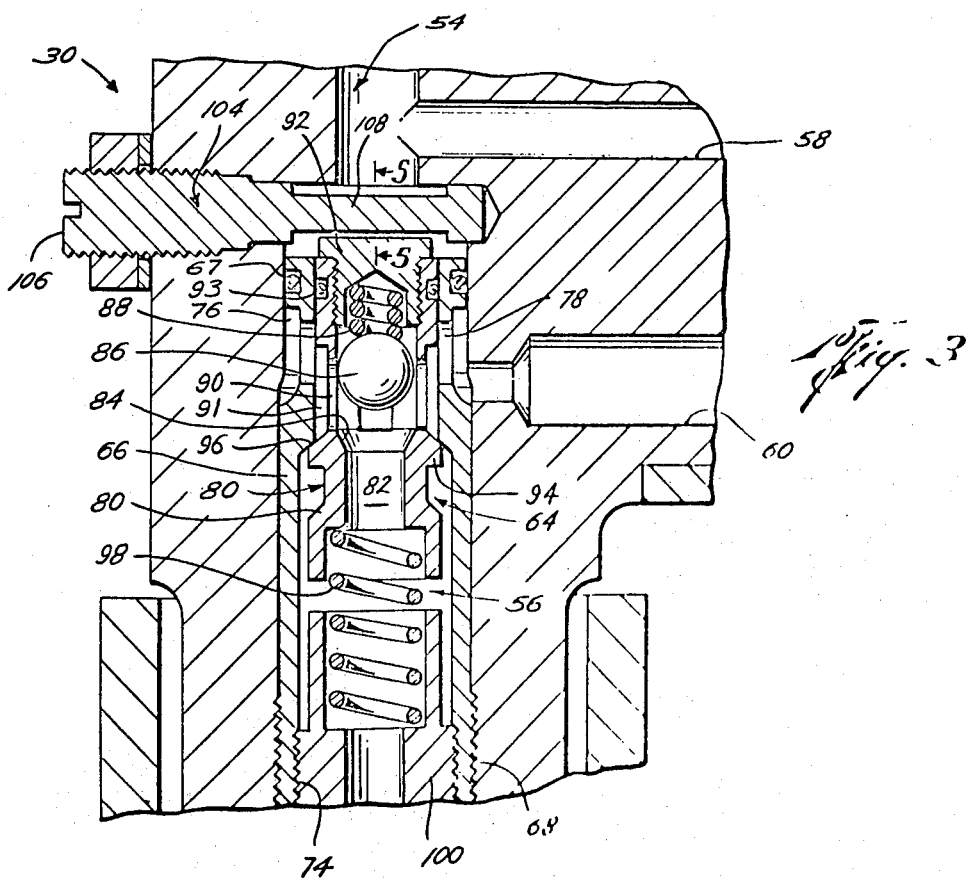
FIG. 3 is a partial plan view, in section, of the safety holding valve of the present invention with the ball closure member in its open position.

Assuming now that the pump forcing the fluid into the passageway 56 is cut off, the pressure urging the ball into the position of FIG. 3 is lost and the spring 88 will return the ball 86 to its closed position as shown in FIG. 2. Accordingly, the fluid within the cylinder cannot now escape. As one will readily understand, should the pressure of the fluid flowing into the passageway 56 be lost for undesirable reasons, such as a line being cut or disconnected, the ball will return to its closed position in the previously described manner, thereby preventing fluid from rapidly flowing from the cylinder. Such a rapid release of the actuating fluid would result in a sudden retraction of the piston rod with possible injury or damage. Thus, the safety holding valve of the present invention functions to prevent the loss or escape of actuating fluid upon a sudden loss of pressure.

Assuming now that one wishes to retract the piston rod, fluid is pumped into the passageway 54 and the side 42 of the piston cylinder. This will start the retraction of the piston rod, thus forcing fluid through the opening 46 and into the passageway 56. As can be seen from an examination of FIG. 2, fluid entering passageway 56 in this manner will merely urge the ball 86 into tighter engagement with this seat 84. Thus, it cannot escape through the spool passage 82. It will, however, act against the flange 94 carried by the spool to force it away from the flange 86, thus opening the annulus 91. This assumes, of course, that there is sufficient pressure acting against the bias of the spring 98 to overcome the bias, as well as to move the spool. This open position is shown in FIG. 4.

As one can see, therefore, the safety holding valve of the present invention provides normally closed valve means having a double conduit system through the valve, one to convey actuating fluid to the cylinder and the second to convey the fluid from the cylinder. This normally closed position prevents any sudden undesired or unexpected release of fluid from the cylinder.

In order to shift the spool 80, a pressure must be exerted against the flange 94 equal to the force or pressure provided by the spring 98, plus an additional amount to actually force the shift in the spool. This additional pressure is known as the "pilot pressure." By way of example, one embodiment of the present invention requires as its pilot pressure approximately 4 percent of the pressure required to hold a given load. This same embodiment utilizes as spring 88 a 50 psi spring, and for spring 98 a 2,000 psi spring, these figures being given merely by way of example.

Another advantage and safety feature provided by the use of the present invention occurs when a large load is being lowered. In order to lower the load, the pilot pressure must be established by pumping the fluid into passageway 54 in order to shift the spool 80 into its open position. When the annulus 91 is open, fluid escapes through passageway 56 and the piston is moved toward the cylinder and carrying the pin 34. The load being carried may be such, however, as to increase the speed of travel of the piston and force fluid out at a faster rate than it is being pumped in through the passageway 54. Since fluid is not entering the side 42 of the cylinder as fast as its volume is expanding, the pressure will be lowered and the pilot pressure necessary to maintain the spool in the open position will be lost. Accordingly, the spool will return to its closed position, thus shutting off the exit of fluid from the side 48 of the cylinder. This will prevent a too rapid lowering or release of a heavy load by automatically closing the annulus 91 whenever the load begins to run away due to its own weight. In this way, the safety holding valve of the present invention accomplishes a metering effect on the flow of actuating fluid from the cylinder.

Another feature offered by the present invention is shown when the crane is used to lift an extremely heavy load which may possibly overload the crane. Such a load could exert sufficient force on the piston, absent sufficient pressure being maintained within the system, as to force the piston rod to retract. Accordingly, this will force fluid against the flange 94 and overcome the force exerted by spring 98, thus shifting the spool to its open position. This will allow the actuating fluid to flow from the cylinder briefly, thus relieving the pressure caused by the extremely heavy load. This will not be a continual flow of fluid from the cylinder, however, but a popping back and forth of the spool as the pressure builds up and is suddenly released. This will bring about a slow lowering of the boom.

It should be understood, however, that the hydraulic system is a closed system and the fluid will normally have no place to escape to in such a situation as was last discussed. This is due to the fact that the spool in the master control will be in a closed position. Accordingly, the line leading to passageway 56 and passageway 56 itself would be completely filled with fluid at the pressure being maintained throughout the system. Such automatic opening of the spool would occur, therefore, only should a hydraulic line break or become disconnected or some other action occur so that the hydraulic fluid could escape the closed system.

The manually operated cam means 104 is included in the present invention so that the boom can be lowered should a power failure occur which would prevent the pumping of fluid to and from the hydraulic unit. By use of a screw driver in the end 106 of the cam means, the cam portion 108 can be rotated to contact the end cap 92. This will push the spool to its open position of FIG. 4. Thus, the annulus 91 will be opened for the escape of fluid and the gradual lowering of the boom. This cam surface is more clearly shown in FIG. 5 and requires only a one-quarter turn to release the spool 80.

As can be seen, therefore, the present invention achieves the objectives set forth at the outset. A safety holding valve has been provided as an interior part of the rod eye assembly for double acting hydraulic units. This safety holding valve will prevent the unexpected release of fluid from the cylinder under normal load conditions should a loss of pressure in the line occur. It will also provide the safety feature of preventing a heavy load from running away during the lowering step by automatically shutting off the escape of actuating fluid when the pilot pressure is lost. Due to the fact that the saftey holding valve may be made with a single cartridge, it may easily be installed and removed or replaced with little difficulty and with only a brief halt in the operation of the crane.

The present invention, therefore, is well adapted to carry out the objects and obtain the ends and advantages mentioned, as well as others inherent therein. While the preferred embodiment of the invention has been given for the purpose of disclosure, numerous changes in the details of construction, and the combination, shape, size and arrangement of parts may be resorted to without departing from the spirit and scope of the invention as hereinafter claimed.

What is claimed is:

1. In a double-acting hydraulic cylinder and piston unit comprising a cylinder, a piston, and a piston rod in which the hydraulic fluid is supplied to both sides of said piston through the piston rod, an improved rod eye assembly comprising, a rod eye body attached to one end of said piston rod and having first and second sides, a fluid passageway in each side of the rod eye body, each of said passageways having an external port in its respective rod eye body side and an internal port for communication with the interior of said piston rod for conveying actuating fluid to and from said unit, swivel joint means at each of said external ports for conveying actuating fluid to and from the respective passageways and for rotatably supporting said one end of said piston rod, safety valve means in at least one of said passageways for sealing said one passageway in a fluid-tight manner when no pressure of greater than a first predetermined amount is exerted on the safety valve means from the external port of said one passageway, and no pressure of greater than a second predetermined amount is exerted on said safety valve means from either of (a) the internal port of said one passageway and (b) the other of said passageway, the other of said passageways being in fluid contact with said safety valve means, said second predetermined pressure being greater than the first predetermined pressure, said safety valve means further including, first and second conduit means connecting said external and internal ports of said one passageway in fluid communication, first, normally closed, sealing means in said first conduit means for opening said first conduit means when subjected to a pressure of greater than said first predetermined amount on the side of the first sealing means closest to the external port of said one passageway, said first sealing means further including, an annular seat in said passage, a ball closure member spring biased into first engagement with said annular seat with said predetermined amount of pressure, the ball being located between the annular seat and the internal port of said one passageway, second, normally closed, sealing means in said second conduit means for opening said second conduit means when subjected to a pressure of greater than said second predetermined amount on the side of the second sealing means closest to the internal port of said one passageway, said second sealing means further including, a cylindrical spool slidable within said one passageway and being of a smaller diameter than said one passageway, said first conduit means being defined as a passage extending through said spool, the second conduit means being defined as an annulus formed between the spool and said one passageway, an annular flange on said spool, an annular flange in said one passageway between the flange on the spool and the internal port, for contacting the flange on said spool in sealing engagement, spring means for forcing the flange on the spool into contact with the passageway flange with said second predetermined amount of pressure, means on the safety valve means for opening the second, normally closed, sealing means in response to pressure in the other of said passageways in excess of a third predetermined amount, and manually operated cam means partially extending into said one passageway for moving the flange on the spool against the force exerted by said spring means and out of contact with the passageway flange.

2. In a double-acting hydraulic cylinder and piston unit comprising a cylinder, a piston, and a piston rod for use on a crane and having in said piston rod first conduit means for conveying hydraulic fluid to one side of said piston and second conduit means for conveying hydraulic fluid to the other side of said piston, the improvement comprising a rod eye assembly including, a rod eye body attached to one end of said piston rod externally of said cylinder, opposed ends on the rod eye body, a first passageway in said body having an opening at one of said opposed ends, a second passageway in said body having an opening at the other of said opposed ends, a first port connecting the first passageway to the first conduit means, a second port connecting the second passageway to the second conduit means, swivel joint means at each end of said openings for conveying hydraulic fluid to and from their respective passageways and for rotatably supporting said one end of said piston rod, a spool of smaller diameter than said first passageway and being slidable therein, an annulus formed between the spool and the first passageway, said annulus being in fluid communication with the first port and said first passageway opening, a passage extending longitudinally through the spool and being in fluid communication with the first port and said first passageway opening, an external annular flange on the spool, an internal annular flange in the first passageway for mating in sealing engagement with said external flange, said internal flange being positioned between the first port and the external flange, spring means for biasing the external flange into sealing engagement with the internal flange, whereby said annulus is normally sealed, a seat in said passage, a ball, spring-biased into engagement with the seat, whereby the passage is normally sealed and means on said spool responsive to pressure in the second passageway for moving the internal flange out of engagement with the external flange, whereby said annulus is opened, said bias on the ball bearing is in the opposite direction to the bias exerted on said external flange and is of a lesser magnitude and said external flange is fixedly attached to the spool, said spring means contacting the spool to urge the external flange into contact with the internal flange, and cam means partially positioned in the first passageway for movement of the external flange out of seating engagement with the internal flange, whereby the first port is placed in fluid communication with the first passageway opening through said annulus.

3. The invention of claim 2 wherein the cam means is further defined as, rotatably positioned adjacent the end of the spool opposite said first passageway opening, whereby the spool and fixed external flange are urged toward the first passageway opening by rotation of the cam means, and a portion of the cam means extends externally of the rod eye body for manual rotation of the cam means.

* * * * *